United States Patent
Orth et al.

(10) Patent No.: US 7,608,128 B2
(45) Date of Patent: Oct. 27, 2009

(54) DIRECT REDUCTION PROCESS AND APPARATUS

(75) Inventors: Andreas Orth, Friedrichsdorf (DE); Heinz Eichberger, Bad Soden (DE); Donald Keith Philp, Bibra Lake (AU); Jeantine Van Gemund, legal representative, Bibra Lake (AU); Rod Dry, City Beach (AU)

(73) Assignee: Outotec Oyj, Espoo (FI)

( * ) Notice: Subject to any disclaimer, the term of this patent is extended or adjusted under 35 U.S.C. 154(b) by 193 days.

(21) Appl. No.: 11/569,739

(22) PCT Filed: May 20, 2005

(86) PCT No.: PCT/EP2005/005464

§ 371 (c)(1),
(2), (4) Date: Apr. 19, 2007

(87) PCT Pub. No.: WO2005/116273

PCT Pub. Date: Dec. 8, 2005

(65) Prior Publication Data

US 2007/0256519 A1    Nov. 8, 2007

(30) Foreign Application Priority Data

May 31, 2004    (AU)    .............................. 2004902899

(51) Int. Cl.
*C21B 13/14*    (2006.01)
(52) U.S. Cl. .............................. 75/448; 75/450; 266/172
(58) Field of Classification Search .................. 75/448, 75/450; 266/172
See application file for complete search history.

(56) References Cited

U.S. PATENT DOCUMENTS

| 4,806,158 A | 2/1989 | Hirsch et al. |
| 5,603,748 A | 2/1997 | Hirsch et al. |
| 6,053,961 A * | 4/2000 | Satchell, Jr. .................. 75/448 |

OTHER PUBLICATIONS

Bresser W et al: "Circored and Circofer:State of the Art Technology for Low Cost Direct Reduction," Iron and Steel Engineer, Association of Iron and Steel Engineers, Pittsburgh, U.S, vol. 72, No. 4, Apr. 1, 1995, pp. 81-85.

* cited by examiner

*Primary Examiner*—George Wyszomierski
*Assistant Examiner*—Tima M McGuthry-Banks
(74) *Attorney, Agent, or Firm*—Smith-Hill & Bedell, P.C.

(57) ABSTRACT

A direct reduction process for a metalliferous material includes supplying a solid carbonaceous material and an oxygen-containing gas into a fluidized bed in a first vessel and generating heat by reactions between the oxygen-containing gas and the solid carbonaceous material and any other oxidizable solids and gases in the fluidized bed and discharging a hot off-gas stream containing entrained solids. The process also includes supplying the metalliferous material to a fluidized bed in a second vessel and supplying the hot off-gas stream containing entrained solids from the first vessel to the fluidized bed in the second vessel and partially reducing the metalliferous feed material in the solid state in the fluidized bed and discharging a product stream of partially reduced metalliferous material and an off-gas stream containing entrained solids.

72 Claims, 2 Drawing Sheets

DIRECT REDUCTION PROCESS AND APPARATUS

Figure 1:
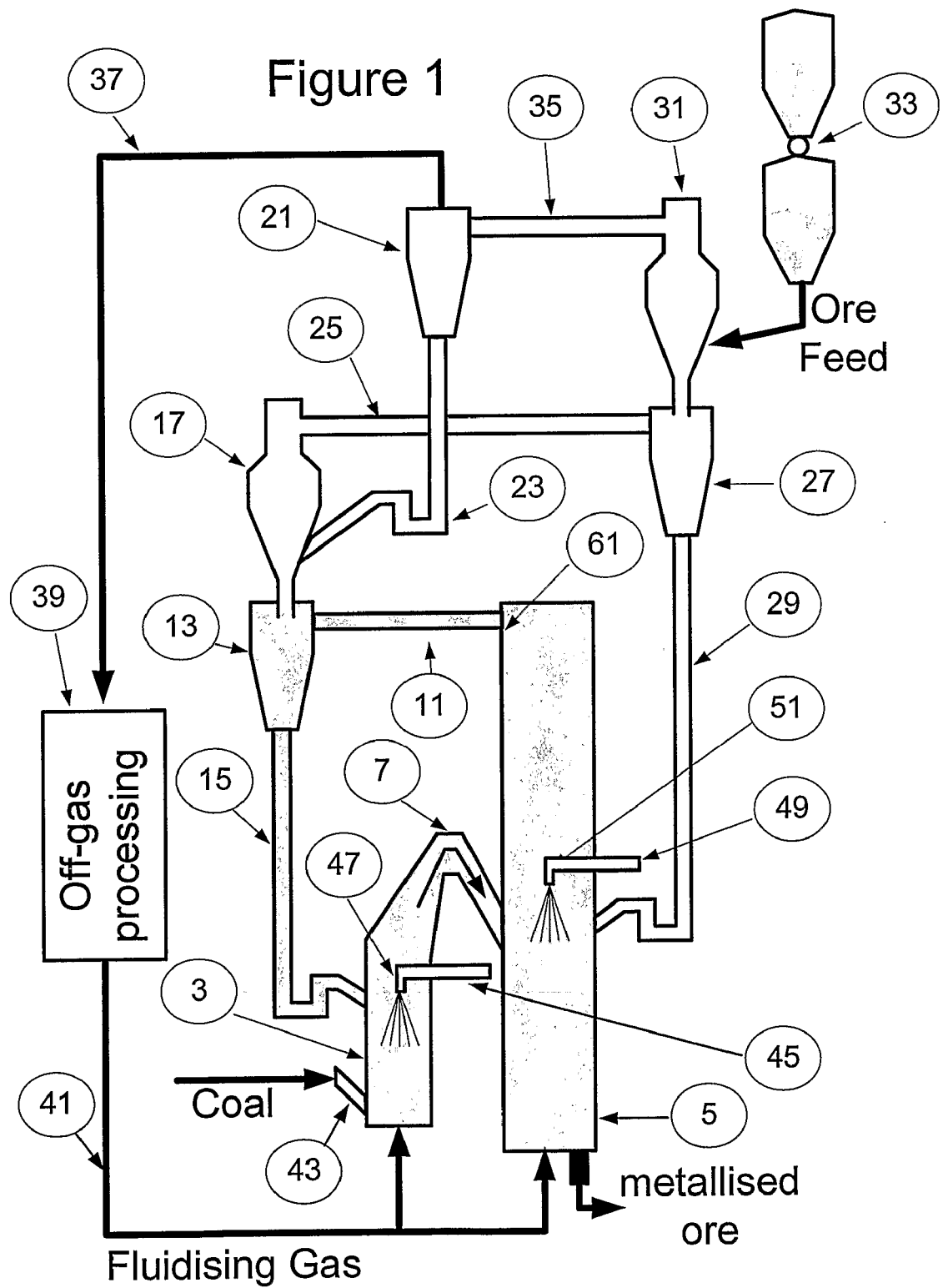

This is a national stage application filed under 35 USC 371 based on International Application No. PCT/EP2005/005464 filed May 20, 2005, and claims priority under 35 USC 119 of Australian Patent Application No. 2004902899 filed May 31, 2004.

The present invention relates to a direct reduction process and apparatus for a metalliferous feed material, particularly, although by no means exclusively, to a direct reduction process and apparatus for an iron-containing feed material, such as iron ore.

The present invention also relates to a process for reducing a metalliferous feed material that comprises a direct reduction process for partially reducing metalliferous feed material in the solid state and a smelting process for melting and further reducing the partially reduced metalliferous feed material to a molten metal.

A known direct reduction technology is the so called "CIRCOFER technology" that is capable of reducing iron ore in the solid state to a metallisation of 50% or higher.

CIRCOFER technology is based on the use of fluidised beds. The main feed materials to the fluidised beds are fluidising gas, metal oxides (typically iron ore fines), solid carbonaceous material (typically coal) and oxygen-containing gas (typically oxygen gas). The main product produced in the fluidised beds is metallised metal oxides, ie metal oxides that have been at least partially reduced.

The applicant has realised that it is possible to effectively and efficiently reduce iron oxides in the solid state in a two stage process in which heat is generated by reactions between solid carbonaceous material and oxygen-containing gas in a first fluidised bed and metalliferous feed material is reduced in a second fluidised bed, with heat being supplied to the second fluidised bed via a stream of hot off-gas and entrained solids from the first fluidised bed.

According to the present invention there is provided a direct reduction process for a metalliferous material which comprises:

supplying a solid carbonaceous material and an oxygen-containing gas into a fluidised bed in a first vessel and generating heat by reactions between the oxygen-containing gas and the solid carbonaceous material and any other oxidisable solids and gases in the fluidised bed and discharging a hot off-gas stream containing entrained solids; and supplying the metalliferous material to a fluidised bed in a second vessel and supplying the hot off-gas stream containing entrained solids from the first vessel to the fluidised bed in the second vessel and at least partially reducing the metalliferous feed material in the solid state in the fluidised bed and discharging a product stream of at least partially reduced metalliferous material and an off-gas stream containing entrained solids.

The above-described process separates the heat generation and reduction functions of the process into two separate vessels and makes it possible to optimise each of these functions.

In particular, separating the heat generation and reduction functions means that it is possible to operate the first vessel at a high temperature to generate heat and ensure destruction of tars and other products of devolatilisation than would be acceptable in a situation in which heat generation and reduction occur in one vessel. Specifically, in a situation in which heat generation and reduction occur in one vessel the potential for accretion problems with metalliferous materials limits the maximum operating temperatures that can be used.

Preferably the process comprises generating temperatures in the first vessel that are higher than the operating temperatures in the second vessel.

Preferably the process comprises operating the first vessel at temperatures above 1000° C.

Preferably the process comprises operating the second vessel at temperatures below 1000° C.

Preferably the process comprises supplying the oxygen-containing gas into the first vessel so that there is a downward flow of the gas in the first vessel.

Preferably the process comprises supplying an oxygen-containing gas into the second vessel.

More preferably the introduction of oxygen-containing gas into the second vessel is performed under such controlled conditions that a desirable agglomeration of smaller reduced ore particles with other particles of feed material to form larger reduced ore particles takes place.

Preferably the process comprises supplying the oxygen-containing gas into the second vessel so that there is a downward flow of the gas in the second vessel.

Preferably the process comprises injecting the oxygen-containing gas into the first vessel and/or the second vessel via at least one lance having a lance tip with an outlet positioned in the vessel inwardly of the side wall of the vessel in a central region of the vessel.

Preferably the lance tip is directed downwardly.

More preferably the lance tip is directed vertically downwardly.

The position of the lance and, more particularly, the height of the outlet of the lance tip, are determined by reference to factors, such as the oxygen-containing gas injection velocity, the vessel pressure, the selection and amounts of the other feed materials to the vessel, and the fluidised bed density.

Preferably the process comprises water-cooling the lance tip to minimise the possibility of accretions forming on the lance tip that could block the injection of the oxygen-containing gas.

Preferably the process comprises water-cooling an outer surface of the lance tip.

Preferably the process comprises injecting the oxygen-containing gas through a central pipe of the lance.

Preferably the process comprises injecting the oxygen-containing gas with sufficient velocity to form a substantially solids-free zone in the region of the lance tip to decrease the possibility of accretions forming on the lance tip that could block the injection of the oxygen-containing gas.

Preferably the process comprises injecting nitrogen and/or steam and/or other suitable shrouding gas and shrouding a lower end of the central pipe to minimise oxidation of metal that could result in accretions forming on the lance tip that could block the injection of the oxygen-containing gas.

Preferably the process comprises separately supplying the metalliferous material and the hot off-gas stream containing entrained solids from the first vessel into the fluidised bed in the second vessel.

Preferably the process comprises controlling the temperature difference between the bulk temperature in the fluidised bed in the second vessel and the average temperature of the inwardly facing surface of a side wall of the second vessel to be no more than 100° C.

The term "bulk temperature" is understood herein to mean the average temperature throughout the fluidised bed.

More preferably the temperature difference is no more than 50° C.

In the case of reducing metalliferous feed material in the form of iron ore fines, preferably the bulk temperature in the fluidised bed in the second vessel is in the range 850° C. to 1000° C.

Preferably the bulk temperature in the fluidised bed in the second vessel is at least 900° C., more preferably at least 950° C.

Preferably the process comprises controlling the temperature variation within the fluidised bed in the second vessel to be less than 50° C.

The temperature difference may be controlled by controlling a number of factors including, by way of example, the amounts of the solids and the gases supplied to the second vessel and the selection of the solids and the gases.

In addition, preferably the process comprises controlling the pressure in at least the second vessel to be in the range of 1-10 bar absolute and more preferably 4-8 bar absolute.

In the case of reducing metalliferous material in the form of iron ore fines, preferably the fines are sized to minus 6 mm.

Preferably the fines have an average particle size in the range 0.1-0.8 mm.

One of the advantages of the process is that it can accept a substantial amount of metalliferous feed material with a particle size of less than 100 microns without a significant amount of this material exiting the process entrained in off-gas. This is believed to be due to an agglomeration mechanism operating within the fluidised bed that promotes a desirable level of agglomeration between particles of feed materials, particularly sub-100 micron particles, without appearing to promote uncontrolled agglomeration capable of interrupting operation of the fluidised bed. Similarly, friable ores that have a tendency to break down during processing and to thereby increase the proportion of particles in the fluidised bed with a size of less than 100 microns may be processed without significant loss of feed material in process off-gas.

Preferably the solid carbonaceous material is coal. In such a situation, the process devolatilises the coal to char and at least part of the char reacts with oxygen and forms CO in the fluidised bed in the first vessel.

The coal may be any suitable coal. By way of example, the coal may be medium-high volatiles coal crushed to minus 6 mm.

Preferably the fluidising gas comprises a non-oxidising gas.

Preferably the fluidising gas in the second vessel comprises a reducing gas, such as CO and $H_2$.

Preferably the process comprises selecting the amount of $H_2$ in the fluidising gas in the second vessel to be at least 10% by volume of the total volume of CO and $H_2$ in the gas.

Preferably the process comprises separating at least partially reduced metalliferous feed material and at lest a portion of other solids (for example char) from the product stream from the second vessel.

Preferably the process comprises returning at least a part of the other solids separated from the product stream to the first vessel and/or the second vessel.

Preferably the process comprises separating at least a portion of the solids from the off-gas stream from the second vessel.

Preferably the process comprises supplying the solids separated from the output off-gas stream to the first vessel.

Preferably the process comprises preheating metalliferous feed material with the off-gas from the second vessel.

Preferably the process comprises treating the off-gas after the preheating step and returning at least a part of the treated off-gas to the first vessel and/or the second vessel as fluidising gas.

Preferably the off-gas treatment comprises one or more of (a) solids removal, (b) cooling, (c) $H_2O$ removal; (d) $CO_2$ removal, (e) compression, and (f) reheating.

Preferably the off-gas treatment comprises returning at least a portion of the separated solids to the first vessel and/or the second vessel.

The oxygen-containing gas may be any suitable gas.

Preferably the oxygen-containing gas comprises at least 90% by volume oxygen.

According to the present invention there is also provided a direct reduction apparatus for a metalliferous material which comprises:

(a) a first vessel for generating a hot off-gas stream containing entrained solids, the first vessel comprising an inlet means for supplying a solid carbonaceous material, a fluidising gas, and an oxygen-containing gas into the first vessel and maintaining a fluidised bed in the vessel and producing the hot off-gas stream containing entrained solids, and an outlet means for discharging the hot off-gas stream containing entrained solids from the vessel; and (b) a second vessel for at least partially reducing metalliferous material in a solid state in a fluidised bed in the second vessel, the second vessel comprising an inlet means for supplying the metalliferous material, the hot off-gas stream containing entrained solids from the first vessel, and a fluidising gas into the second vessel and maintaining the fluidised bed in the vessel, an outlet means for discharging a predominantly solids stream of at least partially reduced metalliferous feed material from the second vessel, and an outlet means for discharging a stream of an off-gas and entrained solids from the second vessel.

Preferably the first vessel comprises separate inlet means for supplying each of the solid carbonaceous material, the fluidising gas, and the oxygen-containing gas into the first vessel.

Preferably the inlet means for supplying oxygen-containing gas into the first vessel comprises a lance having a lance tip with an outlet positioned in the vessel inwardly of the side wall of the vessel in a central region of the vessel.

Preferably the lance tip is directed downwardly in a central region of the vessel for injecting the oxygen-containing gas in a downward flow.

Preferably the lance tip is directed vertically downwardly.

Preferably the second vessel comprises separate inlet means for supplying each of the metalliferous feed material, the hot off-gas stream containing entrained solids from the first vessel, and the fluidising gas into the second vessel.

Preferably the second vessel comprises an inlet means for supplying oxygen-containing gas into the second vessel.

Preferably the inlet means for supplying oxygen-containing gas into the second vessel comprises a lance having a lance tip with an outlet positioned in the vessel inwardly of the side wall of the vessel in a central region of the vessel.

Preferably the lance tip is directed downwardly in a central region of the second vessel for injecting the oxygen-containing gas in a downward flow.

Preferably the lance tip is directed vertically downwardly.

Preferably the apparatus comprises a means for separating entrained solids from the off-gas stream from the second vessel.

Preferably the first vessel further comprises an inlet means for supplying separated solids from the off-gas separation means into the first vessel.

Preferably the apparatus comprises a means for processing the off-gas stream from the second vessel and producing at least part of the fluidising gas for the first vessel and/or the second vessel.

According to the present invention there is also provided a process for reducing a metalliferous material that comprises (a) a direct reduction process for partially reducing metalliferous material in the solid state as described above and (b) a smelting process for melting and further reducing the partially reduced metalliferous material to molten metal.

Figure 2:
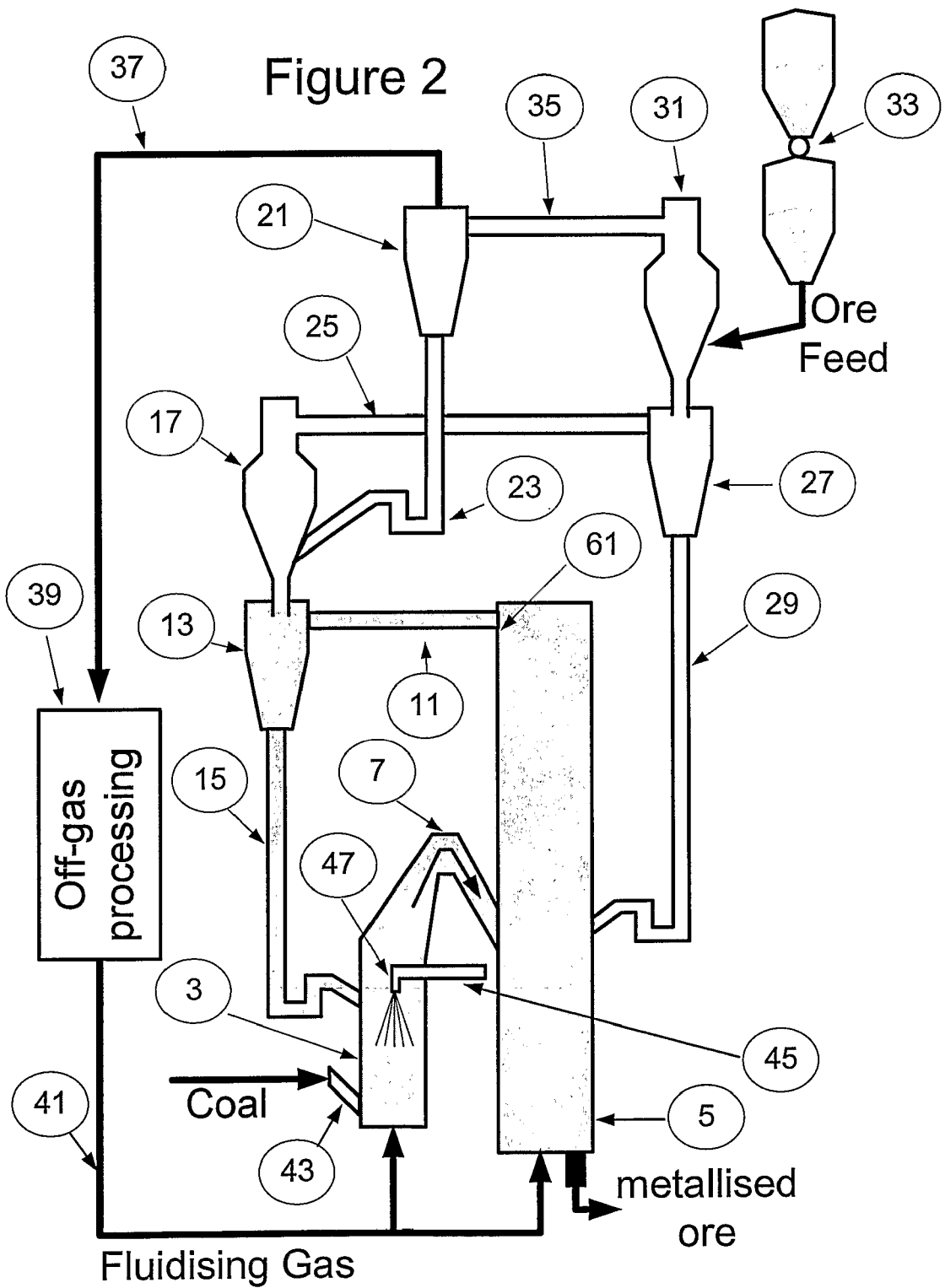

The present invention is described further with reference to the accompany drawings, of which:

FIG. 1 is a diagram of an embodiment of an apparatus for direct reduction of a metalliferous feed material in accordance with the present invention; and FIG. 2 is a diagram of another embodiment of an apparatus for direct reduction of a metalliferous feed material in accordance with the present invention.

The following description is in the context of direct reduction of a metalliferous material in the form of iron ore in a solid state. The present invention is not so limited and extends to direct reduction of other iron-containing materials (such as ilmenite) and more generally to other metalliferous materials.

The following description is also in the context of direct reduction of iron ore with coal as a solid carbonaceous material, oxygen as an oxygen-containing gas, and recycled off-gas containing a mixture of CO and $H_2$ as a fluidising gas. The present invention is not so limited and extends to the use of any other suitable solid carbonaceous material, oxygen-containing gas, and fluidising gas.

With reference to FIG. 1, the apparatus comprises a first vessel 3 that contains a fluidised bed of gas and entrained solids and a second vessel 5 that contains a fluidised bed of gas and entrained solids.

The first vessel 3 functions as at a heat generator and generates a stream of hot off-gas containing entrained solids, predominantly char, that is transferred to the second vessel 5 via a line 7. The purpose of the hot off-gas stream is to provide at least part of the heat required for reactions in the second vessel.

The second vessel 5 functions as a direct reduction reactor and at least partially reduces iron ore fines in the solid state.

The second vessel produces two output streams.

One output stream, which is discharged from the second vessel 5 via an outlet 9 in the base of the second vessel 5, comprises a predominantly solids stream of at least partially reduced iron ore fines and other solids, typically char.

The solids stream may be processed by separating the at least partially reduced iron ore fines and at least a portion of the other solids. The other solids, predominantly char, separated from the product steam may be returned to the first vessel and/or the second vessel as a part of the solids feed for the vessels. The at least partially reduced iron ore is further processed as required. By way of example, the at least partially reduced iron ore may be supplied to a molten bath-based smelting vessel and smelted to molten iron, for example by a process such as the so called "HIsmelt process".

The other output stream from the second vessel 5, which is discharged via an outlet 61 in an upper section of the second vessel 5, comprises hot off-gas and entrained solids.

The off-gas stream is transferred to a cyclone 13 via a line 11. The cyclone 13 separates at least part of the entrained solids from the off-gas stream. The separated solids flow downwardly from the cyclone 13 via a line 15 into the first vessel 3. The off-gas stream flows upwardly from the cyclone 13 into a mixing chamber 17.

The off-gas from cyclone 13 mixes with and heats solids passed to the mixing chamber 17 from a further cyclone 21 via a line 23. The majority of solids in mixing chamber 17 are entrained in off-gas and pass to cyclone 27 via line 25.

There is solids/gas separation in the cyclone 27. Separated solids flow downwardly from the cyclone 27 via a line 29 into the second vessel 5. Off-gas from the cyclone 27 along with any remaining solids flows upwardly from the cyclone 27 into a further mixing chamber 31.

The off-gas stream from the cyclone 27 mixes with and heats iron ore in the mixing chamber 31. Iron ore is supplied to the mixing chamber 31 via a lock hopper assembly 33. The majority of the material in the mixing chamber 31 is carried over into the cyclone 21 via a line 35. As detailed above, a majority of the material passed to cyclone 21 passes to mixing chamber 17, from where it passes to cyclone 27 and the second vessel 5 via line 29.

The off-gas from the cyclone 21 is transferred via a line 37 to an off-gas processing unit 39 and is treated in the unit as described hereinafter. Specifically, the off-gas is treated by a series of steps including (a) solids removal, (b) cooling the off-gas, (c) $H_2O$ removal, (d) $CO_2$ removal, (e) compression, and (f) reheating.

The treated off-gas from the off-gas processing unit 39 becomes a fluidising gas for the vessels 3 and 5 and is transferred to the vessels via a transfer line 41. The fluidising gas is injected into the base of each vessel 3 and 5.

Medium-high volatile coal having a particle size of minus 6 mm is supplied into a lower section of the first vessel 3 via a solids feed device such as a screw feed or a lance 43 that extends through a side wall of the first vessel 3.

In addition, oxygen is supplied into the first vessel 3 via a lance 45 that has a downwardly extending lance tip 47 with an outlet that directs the oxygen downwardly in a centre region of the first vessel 3.

As is described above, preheated iron ore is supplied into the second vessel 5 via the line 29 and the hot off-gas stream containing entrained solids from the first vessel 3 is supplied into the second vessel via the line 7.

In addition, oxygen is injected into the second vessel 5 via a lance 49 that has a downwardly extending lance tip 51 with an outlet that directs the oxygen downwardly in a central region of the second vessel 5.

The above-described supply of coal, returned solids and fluidising gas into the first vessel 3 produces an upward flow of fluidising gas and entrained coal and other returned solids in a central region of the first vessel 3. Increasingly, as the coal particles and other retained solids move upwardly, the particles disengage from the upward stream of fluidising gas and flow downwardly predominantly in an annular region between the central region and the side wall of the first vessel 3. Ultimately, these retained solids are entrained again in the upward stream of the fluidising gas.

The upward stream of fluidising gas and entrained solids in the central region of the first vessel 3 is countercurrent to the downward flow of oxygen gas. Some solids near the flow of oxygen containing gas may become entrained in the oxygen containing gas and as a result become sticky. The interaction of the counter current flows of fluidising gas and oxygen containing gas is believed to limit the extent to which solids that have become entrained in or that have passed through the oxygen flow can contact vessel surfaces and cause accretions. The formation of accretions is believed to be further limited due to the central location of the flow of oxygen gas within the vessel.

In the first vessel the coal fines are devolatilised to form char and the coal volatiles decompose to gaseous products (such as CO and $H_2$). At least part of the char and the volatiles react with oxygen and form CO and reaction products of the volatiles. These reactions generate substantial heat and, as is described above, the heat is transferred into the second vessel 5 by the hot output off-gas stream containing entrained solids that flows into the second vessel via the line 7.

The above-described supply of the preheated iron ore fines, the hot off-gas stream containing entrained solids from the first vessel 3, the oxygen-containing gas, and the fluidising gas into the second vessel produces an upward flow of gas and entrained solids in a central region of the second vessel 5. Increasingly, as the solid particles move upwardly, the solid particles disengage from the upward stream of gas and flow downwardly predominantly in an annular region between the central region and the side wall of the second vessel 5. Such recirculated solids are either entrained again in the upward stream of the fluidizing gas or are discharged from the vessel.

The fluidising gas and upwards flow of solids fluidised by the fluidising gas in the second vessel 5 is counter current to the downward flow of oxygen containing gas. As described above in relation to the first vessel, this counter current flow of fluidising gas and oxygen containing gas is believed to assist with reducing the extent to which solids that have become entrained in or passed through the flow of oxygen contact vessel surfaces and form accretions.

The above-described supply of the preheated iron ore fines, the hot off-gas stream containing entrained solids from the first vessel 3, the oxygen-containing gas, and the fluidising gas into the second vessel 5 produces the following reactions in the second vessel.

Reaction of at least part of the $CO_2$ (formed during reduction of iron ore) with carbon to form CO (Boudouard reaction).

Direct reduction of iron ore fines to at least partially reduced iron by CO, and $H_2$, which reactions form $CO_2$ and $H_2O$.

Oxidation of solids and gases such as char and particles of partially reduced metalliferous feed material, coal volatiles carried over from the first vessel 3, $H_2$ and CO in an upper section of the second vessel 5 which generates heat and promotes controlled agglomeration of smaller partially reduced ore particles with other particles within the fluidised bed to form larger reduced ore particles.

The applicant does not have a totally clear understanding at this stage of the mechanism or mechanisms that enable controlled agglomeration of metalliferous material mentioned above to be achieved. Nevertheless, without wishing to be bound by the following comments, in a research project the applicant observed that the agglomerates that formed comprise smaller particles, particularly fines that adhere to each other and to larger particles. The applicant speculates that the conditions in the upper section of the vessel are such that (a) micron sized partially and completely reduced, i.e. metallised, iron ore particles react with oxygen and generate heat and the resultant oxidised particles become sticky (b) fine coal particles react with oxygen and oxidise and the resultant ash becomes sticky; and (c) fine iron ore particles become sticky as a consequence of being heated. The applicant also speculates that these smaller sticky particles adhere to larger particles that have a higher heat sink capacity, with the overall beneficial result that there is a reduction in the proportion of smaller particles in the vessel that can adhere to apparatus surfaces and be carried out from the vessel in an off-gas stream.

The apparatus shown in FIG. 2 is substantially identical to that shown in FIG. 1 and the same reference numerals are used to describe the same features.

The main difference between the two arrangements is that the apparatus shown in FIG. 2 does not have an oxygen injection lance in the second vessel 5.

The reasons for omitting the oxygen lance in the second vessel 5 could be that (a) sufficient controlled agglomeration can be achieved by oxygen injection solely into the first vessel 3 or (b) the feed iron ore does not contain a large amount of ultra fine particles.

Many modifications may be made to the embodiments of the present invention shown in FIGS. 1 and 2 without departing from the spirit and scope of the invention.

By way of example, whilst the first vessel 3 of each of the embodiments comprises a lance 45 that has a downwardly extending lance tip 47 that injects oxygen downwardly countercurrent to an upward flow of solids and fluidising gas, the present invention is not so limited and extends to other arrangements. Specifically, the present invention is not limited to injecting oxygen downwardly via one or more than one lance 45 that has a downwardly extending lance tip 47.

In addition, the present invention is not limited to countercurrent flows of oxygen and solids and fluidising gas.

The invention claimed is:

1. A direct reduction process for a metalliferous material comprising:
supplying a solid carbonaceous material, an oxygen-containing gas and a fluidizing gas to a first vessel for maintaining a fluidized bed in the first vessel and generating heat by reactions between the oxygen-containing gas and the solid carbonaceous material and any other oxidizable solids and gases in the fluidized bed and discharging a hot off-gas stream containing entrained solids, and
supplying the metalliferous material and a fluidizing gas to a second vessel for maintaining a fluidized bed in the second vessel and supplying the hot off-gas stream containing entrained solids from the first vessel to the fluidized bed in the second vessel and at least partially reducing the metalliferous feed material in the solid state in the fluidized bed and discharging a product stream of at least partially reduced metalliferous material and an off-gas stream containing entrained solids,
and wherein the oxygen-containing gas is supplied into the first vessel so that there is a downward flow of the gas in the first vessel.

2. Process according to claim 1, comprising operating the first vessel at higher temperatures than the second vessel.

3. Process according to claim 1, comprising operating the first vessel at temperatures above 1000° C.

4. Process according to claim 1, comprising operating the second vessel at temperatures below 1000° C.

5. Process according to claim 1, comprising injecting the oxygen-containing gas into the first vessel via at least one lance having a lance tip with an outlet positioned in the first vessel inwardly of the side wall of the vessel in a central region of the vessel.

6. Process according to claim 5, wherein the lance tip is directed vertically downwardly.

7. Process according to claim 5, comprising water-cooling the lance tip.

8. Process according to claim 5, wherein comprising water-cooling an outer surface of the lance tip.

9. Process according to claim 5, comprising injecting the oxygen-containing gas through a central pipe of the lance.

10. Process according to claim 9, comprising injecting nitrogen and/or steam and/or other suitable shrouding gas and shrouding a lower end of the central pipe.

11. Process according to claim 5, comprising injecting the oxygen-containing gas with sufficient velocity to form a substantially solids-free zone in the region of the lance tip to decrease the possibility of accretions forming on the lance tip that could block the injection of the oxygen-containing gas.

12. Process according to claim 1, comprising controlling the temperature difference between the bulk temperature in the fluidized bed in the second vessel and the average temperature of the inwardly facing surface of a side wall of the second vessel to be no more than 100° C.

13. Process according to claim 1, wherein the metalliferous material is in the form of iron ore fines, and the bulk temperature in the fluidized bed in the second vessel is in the range 850° C. to 1000° C.

14. Process according to claim 1, comprising controlling variation in temperature within the fluidized bed in the second vessel to be less than 50° C.

15. Process according to claim 1, comprising controlling the pressure in at least the second vessel to be in the range of 1-10 bar absolute.

16. Process according to claim 1, wherein the metalliferous material is in the form of iron ore fines.

17. Process according to claim 1, wherein the solid carbonaceous material is coal.

18. Process according to claim 1, comprising supplying a non-oxidizing gas as a fluidizing gas.

19. Process according to claim 1, comprising supplying a reducing gas to the second vessel as a fluidizing gas.

20. Process according to claim 19, comprising supplying a mixture of CO and $H_2$ to the second vessel as the fluidizing gas, and wherein the amount of $H_2$ in the fluidizing gas in the second vessel is at least 10% by volume of the total volume of CO and $H_2$ in the gas.

21. Process according to claim 1, comprising separating at least partially reduced metalliferous feed material and at least a portion of other solids from the product stream from the second vessel.

22. Process according to claim 21, comprising returning at least a part of the other solids separated from the product stream to the first vessel and/or the second vessel.

23. Process according to claim 1, comprising separating at least a portion of the entrained solids from the off-gas stream from the second vessel.

24. Process according to claim 23, comprising supplying the solids separated from the output off-gas stream to the first vessel.

25. Process according to claim 1, comprising preheating metalliferous feed material with the off-gas from the second vessel.

26. Process according to claim 25, comprising treating the off-gas after the preheating step and returning at least a part of the treated off-gas to the first vessel and/or the second vessel as fluidizing gas.

27. Process according to claim 26, wherein the off-gas treatment comprises one or more of (a) solids removal, (b) cooling, (c) $H_2O$ removal, (d) $CO_2$ removal, (e) compression, and (f) reheating.

28. Process according to claim 26, wherein the off-gas treatment comprises returning at least a portion of the separated solids to the first vessel and/or the second vessel.

29. Process according to claim 1, wherein the oxygen-containing gas comprises at least 90% by volume oxygen.

30. Process according to claim 1, comprising an additional smelting process for melting and further reducing the partially reduced metalliferous material to molten metal.

31. A direct reduction process for a metalliferous material comprising:

supplying a solid carbonaceous material, an oxygen-containing gas and a fluidizing gas to a first vessel for maintaining a fluidized bed in the first vessel and generating heat by reactions between the oxygen-containing gas and the solid carbonaceous material and any other oxidizable solids and gases in the fluidized bed and discharging a hot off-gas stream containing entrained solids, supplying the metalliferous material and a fluidizing gas to a second vessel for maintaining a fluidized bed in the second vessel and supplying the hot off-gas stream containing entrained solids from the first vessel to the fluidized bed in the second vessel and at least partially reducing the metalliferous feed material in the solid state in the fluidized bed and discharging a product stream of at least partially reduced metalliferous material and an off-gas stream containing entrained solids, and supplying an oxygen-containing gas into the second vessel.

32. Process according to claim 31, comprising operating the first vessel at higher temperatures than the second vessel.

33. Process according to claim 31, comprising operating the first vessel at temperatures above 1000° C.

34. Process according to claim 31, comprising operating the second vessel at temperatures below 1000° C.

35. Process according to claim 31, comprising supplying the oxygen-containing gas into the second vessel so that there is a downward flow of gas in the second vessel.

36. Process according to claim 31, comprising injecting the oxygen-containing gas into the second vessel via at least one lance having a lance tip with an outlet positioned in the first vessel inwardly of the side wall of the vessel in a central region of the vessel.

37. Process according to claim 34, wherein the lance tip is directed downwardly.

38. Process according to claim 34, comprising water-cooling the lance tip.

39. Process according to claim 34, wherein comprising water-cooling an outer surface of the lance tip.

40. Process according to claim 34, comprising injecting the oxygen-containing gas through a central pipe of the lance.

41. Process according to claim 40, comprising injecting nitrogen and/or steam and/or other suitable shrouding gas and shrouding a lower end of the central pipe.

42. Process according to claim 36, comprising injecting the oxygen-containing gas with sufficient velocity to form a substantially solids-free zone in the region of the lance tip to decrease the possibility of accretions forming on the lance tip that could block the injection of the oxygen-containing gas.

43. Process according to claim 31, comprising controlling the temperature difference between the bulk temperature in the fluidized bed in the second vessel and the average temperature of the inwardly facing surface of a side wall of the second vessel to be no more than 100° C.

44. Process according to claim 31, wherein the metalliferous material is in the form of iron ore fines, and the bulk temperature in the fluidized bed in the second vessel is in the range 850° C. to 1000° C.

45. Process according to claim 31, comprising controlling variation in temperature within the fluidized bed in the second vessel to be less than 50° C.

46. Process according to claim 31, comprising controlling the pressure in at least the second vessel to be in the range of 1-10 bar absolute.

47. Process according to claim 31, wherein the metalliferous material is in the form of iron ore fines.

48. Process according to claim 31, wherein the solid carbonaceous material is coal.

49. Process according to claim 31, comprising supplying a non-oxidizing gas as a fluidizing gas.

50. Process according to claim 31, comprising supplying a reducing gas to the second vessel as a fluidizing gas.

51. Process according to claim 50, comprising supplying a mixture of CO and $H_2$ to the second vessel as the fluidizing gas, and wherein the amount of $H_2$ in the fluidizing gas in the second vessel is at least 10% by volume of the total volume of CO and $H_2$ in the gas.

52. Process according to claim 31, comprising separating at least partially reduced metalliferous feed material and at least a portion of other solids from the product stream from the second vessel.

53. Process according to claim 52, comprising returning at least a part of the other solids separated from the product stream to the first vessel and/or the second vessel.

54. Process according to claim 31, comprising separating at least a portion of the entrained solids from the off-gas stream from the second vessel.

55. Process according to claim 54, comprising supplying the solids separated from the output off-gas stream to the first vessel.

56. Process according to claim 31, comprising preheating metalliferous feed material with the off-gas from the second vessel.

57. Process according to claim 56, comprising treating the off-gas after the preheating step and returning at least a part of the treated off-gas to the first vessel and/or the second vessel as fluidizing gas.

58. Process according to claim 57, wherein the off-gas treatment comprises one or more of (a) solids removal, (b) cooling, (c) $H_2O$ removal, (d) $CO_2$ removal, (e) compression, and (f) reheating.

59. Process according to claim 57, wherein the off-gas treatment comprises returning at least a portion of the separated solids to the first vessel and/or the second vessel.

60. Process according to claim 31, wherein the oxygen-containing gas comprises at least 90% by volume oxygen.

61. Process according to claim 31, comprising an additional smelting process for melting and further reducing the partially reduced metalliferous material to molten metal.

62. A direct reduction apparatus for a metalliferous material comprising:
(a) a first vessel for generating a hot off-gas stream containing entrained solids, the first vessel comprising an inlet means for supplying a solid carbonaceous material, a fluidizing gas, and an oxygen-containing gas into the first vessel and maintaining a fluidized bed in the vessel and producing the hot off-gas stream containing entrained solids, and an outlet means for discharging the hot off-gas stream containing entrained solids from the vessel; and
(b) a second vessel for at least partially reducing metalliferous material in a solid state in a fluidized bed in the second vessel, the second vessel comprising an inlet means for supplying the metalliferous material, the hot off-gas stream containing entrained solids from the first vessel, and a fluidizing gas into the second vessel and maintaining the fluidized bed in the vessel, an outlet means for discharging a predominantly solids stream of at least partially reduced metalliferous feed material from the second vessel, and an outlet means for discharging a stream of an off-gas and entrained solids from the second vessel.

63. Apparatus according to claim 62, wherein the first vessel comprises separate inlet means for supplying each of the solid carbonaceous material, the fluidizing gas, and the oxygen-containing gas into the first vessel.

64. Apparatus according to claim 63, wherein the inlet means for supplying oxygen-containing gas into the first vessel comprises a lance having a lance tip with an outlet positioned in the vessel inwardly of the side wall of the vessel in a central region of the vessel.

65. Apparatus according to claim 64, wherein the lance tip is directed downwardly in a central region of the vessel for injecting the oxygen-containing gas in a downward flow.

66. Apparatus according to claim 62, wherein the second vessel comprises separate inlet means for supplying each of the metalliferous feed material, the hot off-gas stream containing entrained solids from the first vessel, and the fluidizing gas into the second vessel.

67. Apparatus according to claim 62, wherein the second vessel comprises an inlet means for supplying oxygen-containing gas into the second vessel.

68. Apparatus according to claim 67, wherein the inlet means for supplying oxygen-containing gas into the second vessel comprises a lance having a lance tip with an outlet positioned in the vessel inwardly of the side wall of the vessel in a central region of the vessel.

69. Apparatus according to claim 68, wherein the lance tip is directed downwardly in a central region of the second vessel for injecting the oxygen-containing gas in a downward flow.

70. Apparatus according to claim 62, comprising a means for separating entrained solids from the off-gas stream from the second vessel.

71. Apparatus according to claim 70, wherein the first vessel further comprises an inlet means for supplying separated solids from the off-gas separation means into the first vessel.

72. Apparatus according to claim 70, comprising a means for processing the off-gas stream from the second vessel and producing at least part of the fluidizing gas for the first vessel and/or the second vessel.

* * * * *